United States Patent
Lin

(10) Patent No.: US 11,582,731 B2
(45) Date of Patent: Feb. 14, 2023

(54) UPLINK CONTROL INFORMATION TRANSMISSION METHOD AND DEVICE

(71) Applicant: GUANGDONG OPPO MOBILE TELECOMMUNICATIONS CORP., LTD., Dongguan (CN)

(72) Inventor: Yanan Lin, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 202 days.

(21) Appl. No.: 17/033,900

(22) Filed: Sep. 27, 2020

(65) Prior Publication Data
US 2021/0014855 A1    Jan. 14, 2021

Related U.S. Application Data

(63) Continuation of application No. PCT/CN2018/081401, filed on Mar. 30, 2018.

(51) Int. Cl.
*H04W 72/04* (2009.01)
*H04W 72/10* (2009.01)
*H04W 72/12* (2009.01)
*H04W 72/0446* (2023.01)
*H04W 72/1263* (2023.01)

(52) U.S. Cl.
CPC ... *H04W 72/0413* (2013.01); *H04W 72/0446* (2013.01); *H04W 72/10* (2013.01); *H04W 72/1263* (2013.01)

(58) Field of Classification Search
CPC ............ H04W 72/10; H04W 72/0446; H04W 72/1263; H04W 72/0413; H04L 5/0053; H04L 5/0055; H04L 5/0057
See application file for complete search history.

(56) References Cited

U.S. PATENT DOCUMENTS

| | | | |
|---|---|---|---|
| 11,089,623 B2* | 8/2021 | Takeda | H04W 72/0446 |
| 11,258,544 B2* | 2/2022 | Wang | H04L 1/1854 |
| 2015/0223235 A1 | 8/2015 | Hwang et al. | |
| 2020/0328924 A1* | 10/2020 | Nangia | H04W 72/0413 |

(Continued)

FOREIGN PATENT DOCUMENTS

| | | |
|---|---|---|
| CN | 102132604 A | 7/2011 |
| CN | 103546259 A | 1/2014 |

(Continued)

OTHER PUBLICATIONS

Second Office action issued in corresponding Chinese Application No. 202011126336.4, dated Dec. 27, 2021, 11 pages.

(Continued)

*Primary Examiner* — Brian D Nguyen
(74) *Attorney, Agent, or Firm* — Bayes PLLC

(57) ABSTRACT

Provided in the present disclosure are an uplink control information transmission method and device. The method includes determining that a first transmission resource corresponding to uplink data to be transmitted and a second transmission resource corresponding to uplink control information to be transmitted overlap in a time domain. The method also includes transmitting the uplink control information on the second transmission resource and terminating transmission of the uplink data on the first transmission resource.

20 Claims, 5 Drawing Sheets

Determine that a first transmission resource corresponding to uplink data to be transmitted and a second transmission resource corresponding to uplink control information to be transmitted overlap in a time domain — 101

Transmit the uplink control information on the first transmission resource or the second transmission resource — 102

(56) References Cited

U.S. PATENT DOCUMENTS

| | | | | |
|---|---|---|---|---|
| 2020/0344778 A1* | 10/2020 | Zhao | ............... | H04L 5/0092 |
| 2020/0344781 A1* | 10/2020 | Li | ............... | H04W 72/042 |
| 2020/0351867 A1* | 11/2020 | Guo | ............... | H04W 76/27 |
| 2020/0359372 A1* | 11/2020 | Du | ............... | H04L 5/0055 |
| 2020/0374058 A1* | 11/2020 | Wang | ............... | H04W 72/1284 |
| 2020/0389914 A1* | 12/2020 | Zhao | ............... | H04W 72/1289 |
| 2020/0403735 A1* | 12/2020 | Zhao | ............... | H04W 72/0446 |
| 2021/0068138 A1* | 3/2021 | Baldemair | ............... | H04W 72/1284 |
| 2021/0084687 A1* | 3/2021 | Liu | ............... | H04W 72/0446 |

FOREIGN PATENT DOCUMENTS

| | | | |
|---|---|---|---|
| CN | 107027181 A | | 8/2017 |
| CN | 107241805 A | | 10/2017 |
| CN | 107801246 A | | 3/2018 |
| EP | 3 402 270 A1 * | 11/2018 | ............ H04W 72/04 |
| EP | 3 668 239 A1 | | 6/2020 |
| WO | 2010112065 A1 | | 10/2010 |
| WO | 2017132811 A1 | | 8/2017 |
| WO | 2019183942 A1 | | 10/2019 |

OTHER PUBLICATIONS

Notice of Reasons for Refusal issued in corresponding Japanese Application No. 2020-552887, dated Feb. 18, 2022, 10 pages.

"Remaining aspects related to interaction between different TTI lengths", Agenda item: 6.2.1.2.1, Source: Intel Corporation, 3GPP TSG-RAN WG1 #91 R1-1720022, Reno,Nevada, USA, Nov. 27-Dec. 1, 2017, 4 pages.

"Summary of email approval [90b-LTE-12] on sPUSCH/sPUCCH power control and UL collision handling between different TTI lengths", Agenda Item: 6.2.1.2.1, Source: LG Electronics, 3GPP TSG RAN WG1 Meeting #91 R1-1719856, Reno, US, Nov. 27-Dec. 1, 2017, 22 pages.

"Remaining issues on UCI multiplexing", Agenda Item: 7. 1. 3.2. 3, Source: Huawei, HiSilicon, 3GPP TSG RAN WG1 Meeting #92 R1-801341, Athens, Greece, Feb. 26-Mar. 2, 2018, 8 pages.

The First Office action issued in corresponding Chinese Application No. 202011126336.4, dated Sep. 27, 2021, 16 pages.

The First Office action issued in corresponding Canadian Application No. 3,095,492, dated Oct. 14, 2021, 4 pages.

The First Office action issued in corresponding India Application No. 202017045107, dated Aug. 31, 2021, 7 pages.

Communication pursuant to Article 94(3) EPC issued in corresponding European Application No. 18913023.0, dated Sep. 27, 2021, 7 pages.

Decision of Rejection issued in corresponding Chinese Application No. 202011126336.4, dated Apr. 2, 2022, 11 pages.

Communication issued in corresponding European Application No. 18913023.0, dated Apr. 7, 2022, 9 pages.

"Remaining issues for multiplexing UCI on PUSCH", 3GPP TSG RAN WG1 Meeting #92, R1-1802839, Athens, Greece, Feb. 26-Mar. 2, 2018, 13 pages.

PCT Written Opinion of The International Searching Authority issued in corresponding International Application No. PCT/CN2018/081401, dated Dec. 11, 2018, 8 pages.

Supplementary European Search Report issued in corresponding European Application No. EP 18 91 3023.0, dated Feb. 18, 2021, 10 pages.

"Prioritizations of Overlapped UL Transmissions", Agenda item: 7.1.5, Source: Samsung, 3GPP TSG RAN WG1 #84, R1-160542, St Julians, Malta, Feb. 15-19, 2016, 4 pages.

"Remaining issues on UCI multiplexing", Agenda Item: 7. 1. 3.2. 3, Source: Huawei, HiSilicon, 3GPP TSG RAN WG1 Meeting #92 R1-1801341, Athens, Greece, Feb. 26-Mar. 2, 2018, 8 pages.

Third Office Action issued in corresponding European Application No. 18913023.0, dated Nov. 3, 2022.

* cited by examiner

UPLINK CONTROL INFORMATION TRANSMISSION METHOD AND DEVICE

CROSS-REFERENCE TO RELATED APPLICATIONS

This application is a continuation application of International Application No. PCT/CN2018/081401, filed on Mar. 30, 2018, which is incorporated by reference in its entirety.

BACKGROUND

Embodiments of the present disclosure generally relate to communication technologies, and more particularly, to a method and device for transmitting uplink control information.

In Ultra Reliable and Low Latency Communication (URLLC) wireless communication systems such as 5G application scenarios, in order to meet service requirements, a resource configuration of a Scheduling Request (SR) for short-period uplink data is introduced, so that SR can be reported quickly.

In actual applications, a situation where a transmission resource for transmitting SR and a transmission resource for transmitting uplink data overlap in the time domain may occur at a terminal. Therefore, it is urgent to provide an SR transmission method to realize real-time transmission or instant transmission of the SR, when the situation where the transmission resource for transmitting the SR and the transmission resource for transmitting the uplink data conflict in the time domain occurs at the terminal, especially when the transmission resource for transmitting the uplink data is relatively long in the time domain. Similarly, feedback information with low latency requirements and other Uplink Control Information (UCI) also have the same problem. For example, feedback information of downlink data (that is, ACK information when downlink data is correctly received or NACK information when downlink data is not correctly received) and Channel Status Information (CSI).

SUMMARY

Various aspects of the present disclosure provide a method and device for transmitting uplink control information. The method and device can realize real-time transmission or instant transmission of uplink control information when the situation where the transmission resource for transmitting the uplink control information and the transmission resource for transmitting the uplink data conflict in the time domain occurs at a terminal, especially when the transmission resource for transmitting the uplink data is relatively long in the time domain.

According to a first aspect of the present disclosure, there is provided a method for transmitting uplink control information, including determining that a first transmission resource corresponding to uplink data to be transmitted and a second transmission resource corresponding to uplink control information to be transmitted overlap in a time domain; and transmitting the uplink control information on the first transmission resource or the second transmission resource.

According to a second aspect of the present disclosure, there is provided a device for transmitting uplink control information, including a determination unit configured to determine that a first transmission resource corresponding to uplink data to be transmitted and a second transmission resource corresponding to uplink control information to be transmitted overlap in a time domain; and a transmission unit configured to transmit the uplink control information on the first transmission resource or the second transmission resource.

As can be seen from the above technical solutions, in embodiments of the present disclosure, it is determined that the first transmission resource corresponding to the uplink data to be transmitted and the second transmission resource corresponding to the uplink control information to be transmitted overlap in the time domain, and the uplink control information is transmitted on the first transmission resource or the second transmission resource. In this way, real-time transmission or instant transmission of uplink control information can be realized when the situation where the transmission resource for transmitting the uplink control information and the transmission resource for transmitting the uplink data conflict in the time domain occurs at a terminal.

BRIEF DESCRIPTION OF THE DRAWINGS

In order to explain the technical solutions in embodiments of the present disclosure more clearly, the following will briefly introduce the drawings. Obviously, the drawings in the following description are some examples of the present disclosure, and for those of ordinary skill in the art, other drawings can be obtained from these drawings.

DETAILED DESCRIPTION

In order to make the objectives, technical solutions, and advantages of embodiments of the present disclosure more clear, the technical solutions in embodiments of the present disclosure will be described completely with reference to accompanying drawings. Obviously, the described embodiments are a part of the embodiments of the present disclosure, not all the embodiments. Based on the embodiments of the present disclosure, all other embodiments obtained by those of ordinary skill in the art without creative work shall fall within the protection scope of the present disclosure.

The term "and/or" is an association relationship describing associated objects, which means that there can be three relationships, for example, A and/or B, which can mean: A exists only, both A and B exist, or B exist only. In addition, the character "/" generally indicates that the associated objects before and after "/" are in an "or" relationship.

Figure 1A:
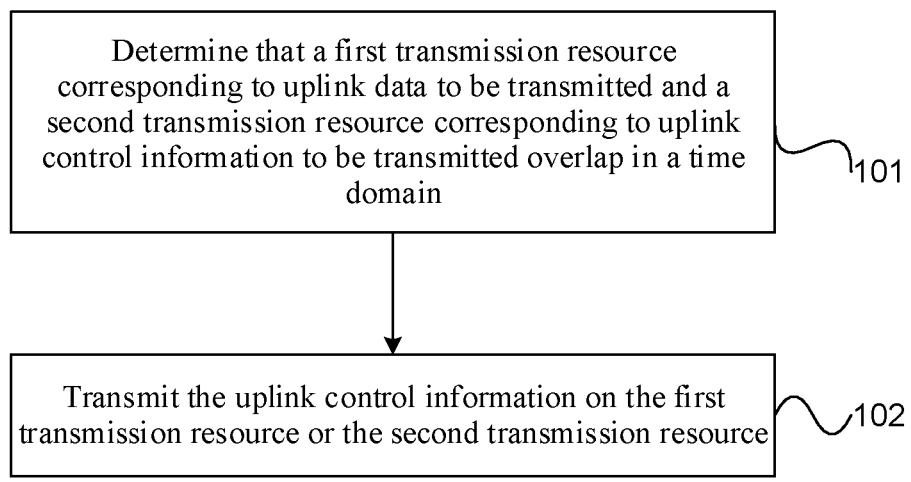
FIG. 1A is a schematic flowchart of a method for transmitting uplink control information according to an embodiment of the present disclosure.

FIG. 1A is a schematic flowchart of a method for transmitting uplink control information according to an embodiment of the present disclosure. As shown in FIG. 1A, the method includes the following steps.

In 101, it is determined that a first transmission resource corresponding to uplink data to be transmitted and a second transmission resource corresponding to uplink control information to be transmitted overlap in a time domain.

The first transmission resource or the second transmission resource may include but is not limited to at least one of a time domain resource, a frequency domain resource, or a power domain resource, which is not particularly limited in this embodiment.

In 102, the uplink control information is transmitted on the first transmission resource or the second transmission resource.

It should be noted that 101 to 102 may be performed by a terminal or a network device, which is not particularly limited in this embodiment.

In embodiments of the present disclosure, the transmitted uplink data refers to uplink data that needs to be transmitted between the terminal and the network device and can be carried by a Physical Uplink Shared Channel (PUSCH).

In embodiments of the present disclosure, the transmitted Uplink Control Information (UCI) refers to the uplink control information that needs to be transmitted between the terminal and the network device, and can also be carried by the Physical Uplink Shared Channel (PUSCH). The uplink control information may include but not limited to at least one of the following information: feedback information of downlink data, that is, ACK information indicating that the downlink data is received correctly, or NACK information indicating that the downlink data is not received correctly; Channel Status Information (CSI); and Scheduling Request (SR) for uplink data.

When uplink control information, such as feedback information of downlink data or channel status information, needs to be mapped to the PUSCH for carrying in a piggyback manner, the piggyback transmission mode can be used.

The technical solutions according to embodiments of the present disclosure can be applied to a New Radio (NR) system, such as a 5G application. The NR system can have three major service scenarios. One is the Enhance Mobile Broadband (eMBB) service, one is the Ultra Reliable and Low Latency Communication (URLLC) service, and the other one is Massive Machine Type of Communication (mMTC). The terminal can transmit the service data and control information of these services on the configured transmission resources depending on service requirements. Therefore, the types involved in the present disclosure may include, but are not limited to, at least one of eMBB service type, URLLC service types, and mMTC service type, which is not particularly limited in embodiments.

In a possible implementation of the embodiment, before 102, the type to which the uplink control information belongs may be further determined.

The type can refer to the service types classified according to the services. For example, one is the Enhance Mobile Broadband (eMBB) service, one is the Ultra Reliable and Low Latency Communication (URLLC) service, and one is massive Machine Type of Communication (mMTC), or the service type may also refer to other types classified according to other standards, which is not particularly limited in embodiments of the present disclosure.

If the type to which the uplink control information belongs is the first type, the uplink control information may be transmitted on the first transmission resource or the second transmission resource.

The first type may refer to a low-latency type, or may also refer to other types, which is not particularly limited in embodiments of the present disclosure.

In an exemplary implementation, the type to which the uplink control information belongs can be determined according to a transmission parameter. The transmission parameter may include but is not limited to at least one of the following parameters: service type indication; Transmission Time Interval (TTI) length, that is, the TTI of the downlink data; feedback timing, for example, feedback timing of the feedback information of the downlink data or feedback timing of CSI, etc.; resource indication type, for example, TypeA or TypeB, etc.; transmission set; period, for example, SR period or CSI period, etc.; and configuration information, for example, SR configuration information, such as SR configuration serial number or priority, or CSI configuration information such as target Block Error Rate (BLER), etc.

In a possible implementation, in 102, the uplink control information may be specifically transmitted on a first part resource of the first transmission resource.

In this implementation, the uplink control information may be specifically mapped to the PUSCH by puncturing, or rate matching may be performed on the uplink data carried in the PUSCH, so that the uplink data is not mapped to the Resource Element (RE) occupied by the first transmission resource.

In this implementation, the first part resource may be used only for transmitting the uplink control information. That is, when there is uplink control information, the first part resource is used for transmitting the uplink control information; and when there is no uplink control information, the first part resource is not used for transmitting uplink data. Alternatively, the first part resource can be used not only for transmitting the uplink control information. That is, when there is uplink control information, the first part resource is used for transmitting the uplink control information; when there is no uplink control information, the first part resource is used for transmitting uplink data, which is not particularly limited in embodiments of the present disclosure.

In this implementation, the period of the first part resource and the period of the uplink control information may be the same or different, which is not particularly limited in embodiments of the present disclosure.

In this implementation, in each transmission opportunity, the number of the first part resources configured may be the same, or may also be different. For example, the number of the first part resources configured in a transmission opportunity close to a Demodulation Reference Signal (DMRS) is relatively small, which is not particularly limited in embodiments of the present disclosure.

In an exemplary implementation, the last symbol of the first part resource is not later than N symbols after the last symbol of the second transmission resource, where N is an integer greater than or equal to zero. As an example, the value of N can be zero.

In another exemplary implementation, the value of N can be configured by the network device.

Specifically, the terminal may specifically receive the value of N sent from the network device by Downlink Control Information (DCI), higher layer signaling, or system broadcast messages.

For example, the higher layer signaling may be a Radio Resource Control (RRC) message. Specifically, the value of N may be carried by an Information Element (IE) in the RRC message. The RRC message may be an RRC message in the related art, for example, the RRC CONNECTION RECONFIGURATION message, etc., and embodiments of the present disclosure do not impose specific limitations on this. The IE of the existing RRC message can be extended to carry the value of N, or the RRC message may also be different from the existing RRC message in the related art.

Or, for another example, the higher layer signaling may be a Media Access Control (MAC) Control Element (CE) message. For example, a new MAC CE message may be added to carry the value of N.

Or, for another example, the existing Master Information Block (MIB) or System Information Block (SIB) in the system broadcast message can be used to carry the value of N, or a new SIB can be added to carry the value of N.

It is understandable that the value of N may also be agreed upon by agreement.

Figure 1B:
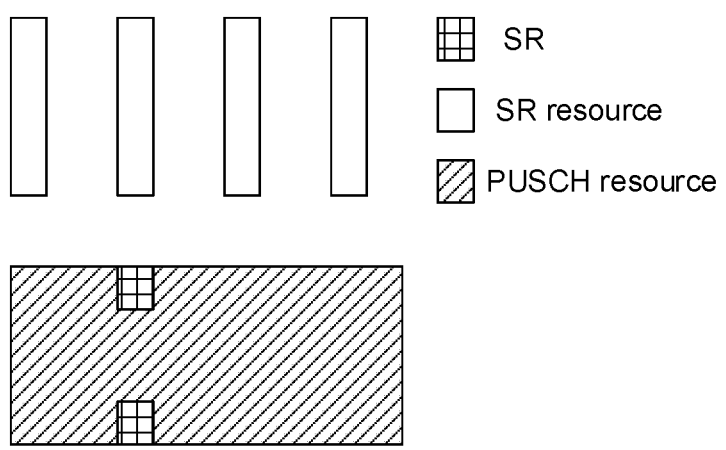
FIG. 1B is a schematic diagram of a transmission resource provided by the embodiment corresponding to FIG. 1A.

In another exemplary implementation, the first part resource may be a part of discontinuous resources of at least one symbol in the first transmission resource in the frequency domain. Taking SR as an example, as shown in FIG. 1B, the period of the configured transmission resource for transmitting the SR (that is, the SR resource) is 2 symbols. When the terminal has a PUSCH to send and an SR is triggered at the same time, the SR can be transmitted on a part of discontinuous resources of the 2 symbols in the resource for transmitting the PUSCH (that is, the PUSCH resource).

In the implementation, the SR can use a specific sequence, for example, the original SR sequence. The sequence is useful for the base station to identify the transmission of the SR. Or, the SR can use a specific value, such as 1, or the SR can be scrambled by a specific value, such as 1. The scramble code of the specific value is different from the scramble code of the uplink data, and this is beneficial for the base station to identify the transmission of the SR, which is not particularly limited in embodiments of the present disclosure.

Figure 1C:
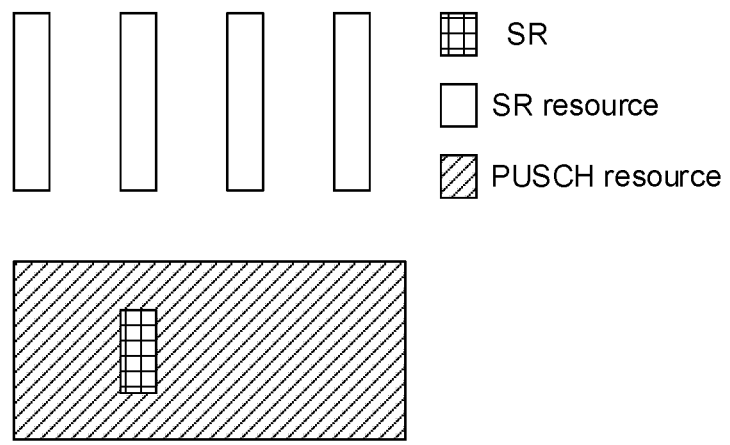
FIG. 1C is a schematic diagram of another transmission resource provided by the embodiment corresponding to FIG. 1A.

In another exemplary implementation, the first partial resource may be a part of continuous resources of at least one symbol in the first transmission resource in the frequency domain. Taking SR as an example, as shown in FIG. 1C, the period of the configured transmission resource for transmitting SR (that is, the SR resource) is 2 symbols. When the terminal has a PUSCH to send and an SR is triggered at the same time, the SR can be transmitted on a part of continuous resources of 2 symbols in the resource for transmitting the PUSCH (that is, the PUSCH resource) in the frequency domain.

In the implementation, the SR can use a specific sequence, for example, the original SR sequence. Or, the SR can use a specific value, such as 1; or the SR can be scrambled by a specific value, such as 1. The scramble code of the specific value is different from the scramble code of the uplink data, which is not particularly limited in embodiments of the present disclosure.

According to embodiments, for continuous resources, a specific sequence can be transmitted preferentially, so that the orthogonality of SR can be guaranteed.

Figure 1D:
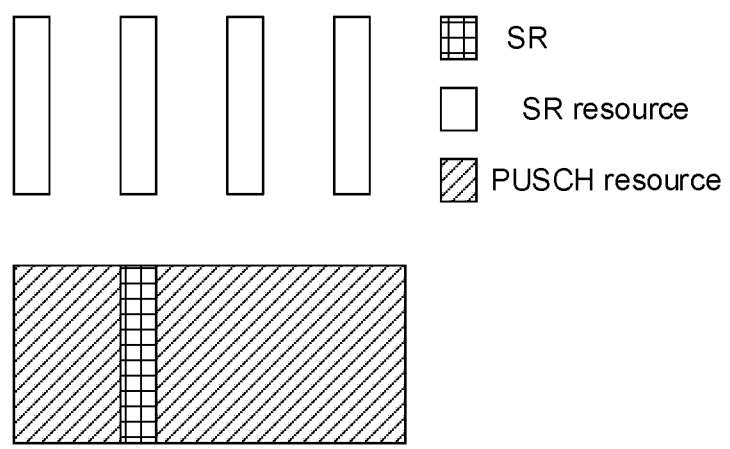
FIG. 1D is a schematic diagram of another transmission resource provided by the embodiment corresponding to FIG. 1A.

In another exemplary implementation, the first part of resources may be all resources of at least one symbol in the first transmission resource in the frequency domain. Taking SR as an example, as shown in FIG. 1D, the period of the configured transmission resource for transmitting the SR (that is, the SR resource) is 2 symbols. When the terminal has a PUSCH to send and an SR is triggered at the same time, the SR can be transmitted on all the resources of 2 symbols in the resource for transmitting the PUSCH (that is, the PSCH resource).

In the implementation, the SR can use a specific sequence, for example, the original SR sequence. Or, the SR can use a specific value, such as 1, or the SR can be scrambled by a specific value, such as 1. The scramble code of the specific value is different from the scramble code of the uplink data, which is not particularly limited in embodiments of the present disclosure.

In another exemplary implementation process, the first part resource can be configured by a network device.

Specifically, the terminal may receive the first part resource sent by the network device through Downlink Control Information (DCI), higher layer signaling or system broadcast messages.

For example, the higher layer signaling may be a Radio Resource Control (RRC) message. Specifically, the first part resource may be carried by an Information Element (IE) in the RRC message, and the RRC message may be an RRC message in the related art, for example, RRC CONNECTION RECONFIGURATION message, etc. This embodiment does not limit this. The IE of the existing RRC message can be extended to carry the first part of resources, or the RRC message may be different from the existing RRC message in the related art.

Or, for another example, the higher layer signaling may be a Media Access Control (MAC) Control Element (CE) message, and for example, a new MAC CE message may be added to carry the first part resource.

Or, for another example, the Master Information Block (MIB) or System Information Block (SIB) in the system broadcast message can be used to carry the first part resources, or a new SIB can be added to carry the first part resource.

It is understandable that the first part resource may also be agreed upon by agreement.

In a possible implementation, in 102, the uplink control information may be specifically transmitted on the second transmission resource, and the uplink data may be transmitted on the first transmission resource.

Figure 1E:
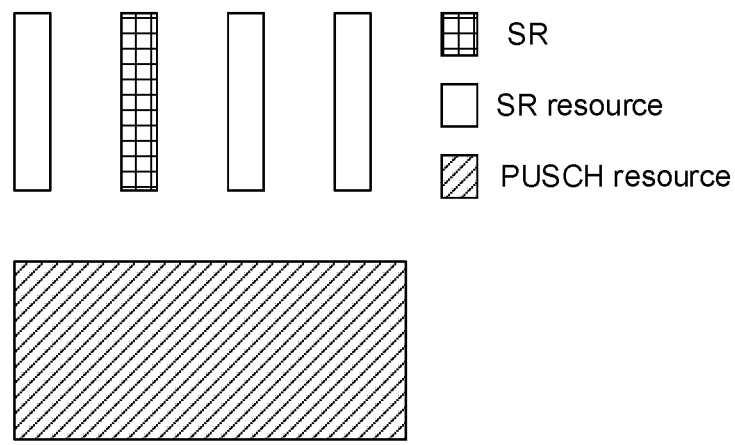
FIG. 1E is a schematic diagram of another transmission resource provided by the embodiment corresponding to FIG. 1A.

In an exemplary implementation process, if the power of the terminal is not limited, the uplink control information and the uplink data can be transmitted in a predetermined manner. Taking SR as an example, as shown in FIG. 1E, the period of the configured transmission resource for transmitting SR (that is, the SR resource) is 2 symbols. When the terminal has a PUSCH to send and an SR is triggered at the same time, the terminal can transmit the SR on the resource for transmitting SR (that is, the SR resource), and transmit the uplink data on the resource for transmitting the PUSCH (that is, the PUSCH resource).

In another exemplary implementation, if the power of the terminal is limited, the uplink control information and uplink data can be adjusted and transmitted in a power scaling mode.

For example, the SR may be transmitted on the SR resource with full power, and PUSCH may be transmitted on the PUSCH resource with reduced power. For example, this method can be used when the PUSCH adopts a more advanced modulation method than Quadrature Phase Shift Key (QPSK).

Or, for another example, SR can be transmitted on the SR resource with full power, the PUSCH resource can be transmitted with reduced power on a resource of the PUSCH resources that overlaps with the SR resource in the time domain, and the PUSCH resource can be transmitted with full power on a resource of the PUSCH resources that does not overlap with the SR resource in the time domain. For example, For example, this method can be used when the PUSCH adopts a lower level modulation method than QPSK.

Or, for another example, the power can be reduced in equal proportion. The SR can be transmitted on the SR resource with a first power, where the first power is k times the full power for transmitting the SR, and k is greater than 0 and less than 1. In the PUSCH resource, the second power is used to transmit the PUSCH resource, where the second power is k times the full power for transmitting the PUSCH.

Or, for another example, the power can be reduced in proportion to the number of Physical Resource Block (PRB). A third power can be used to transmit the SR on the SR resource, where the third power is m times the full power for transmitting the SR, m is a value greater than 0 and less than 1. In PUSCH resources, a fourth power is used to transmit PUSCH resources, where the fourth power is n times the full power for transmitting the SR, and n is greater than 0 and less than 1. The values of m and n can be obtained according to the number of PRBs occupied by the SR and the uplink data.

In an exemplary implementation, in 102, the uplink control information may be transmitted on the second transmission resource, and the transmission of the uplink data on a second part resource of the first transmission resource can be suspended.

Figure 1F:
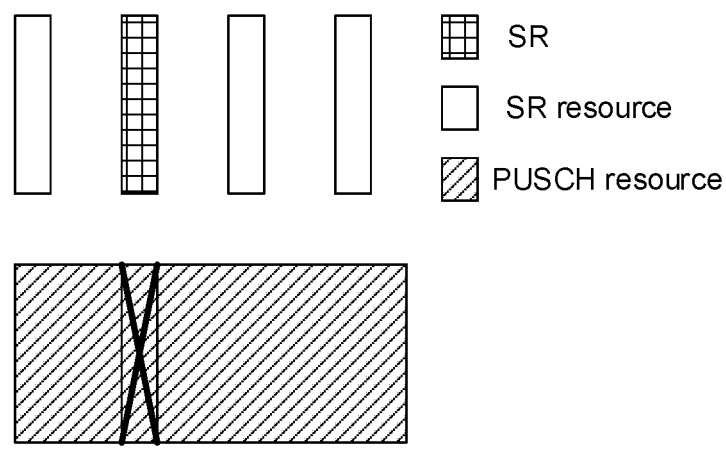
FIG. 1F is a schematic diagram of another transmission resource provided by the embodiment corresponding to FIG. 1A.

Specifically, the second part resource may include, but are not limited to, all resources in the first transmission resource that overlaps with the second transmission resource in the time domain, which is not particularly limited in embodiments of the present disclosure. Taking SR as an example, as shown in FIG. 1F, the period of the configured transmission resource for transmitting the SR (that is, the SR resource) is 2 symbols. When the terminal has a PUSCH to send and an SR is triggered at the same time, the terminal can transmit the SR only on the resource for transmitting the SR (that is, the SR resource), and the transmission of the uplink data on all resources in the resources for transmitting the PUSCH (that is, the PUSCH resources) that overlap with the SR resource in the time domain can be suspended, as indicated by "X" in FIG. 1F. The transmission of the uplink data on all resources in the resources for transmitting the PUSCH (that is, the PUSCH resources) that does not overlap with the SR resource in the time domain can be continued.

Figure 1G:
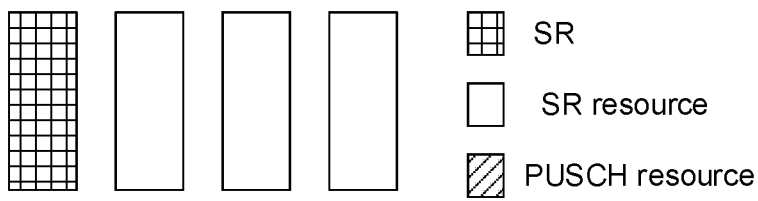
FIG. 1G is a schematic diagram of another transmission resource provided by the embodiment corresponding to FIG. 1A.
Figure 1G:
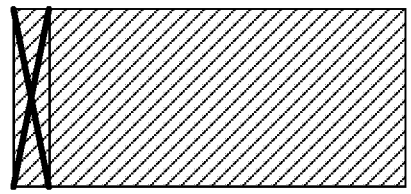

In an exemplary implementation, the transmission start time of the uplink control information is earlier than the transmission start time of the uplink data, as shown in FIG. 1G.

If the transmission start time of the uplink control information is later than the transmission start time of the uplink data, the technical solutions in the prior art can be used to transmit uplink data only on the resource for transmitting the PUSCH (that is, the PUSCH resource). A Buffer Status Report (BSR) can also be transmitted on the PUSCH resource.

Figure 1H:
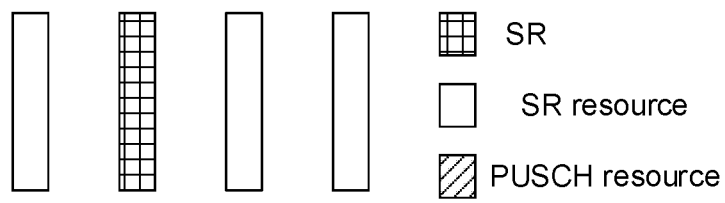
FIG. 1H is a schematic diagram of another transmission resource provided by the embodiment corresponding to FIG. 1A.
Figure 1H:
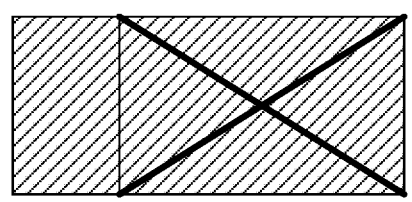

In an exemplary implementation, in 102, the uplink control information may be transmitted on the second transmission resource, and the transmission of the uplink data on the first transmission resource may be terminated. Taking SR as an example, as shown in FIG. 1H, the period of the configured transmission resource for transmitting the SR (that is, the SR resource) is 2 symbols. When the terminal has a PUSCH to send and an SR is triggered at the same time, the terminal can transmit the SR only on the resource for transmitting the SR (that is, the SR resource), and the transmission of the uplink data on the resource for transmitting the PUSCH (that is, the PUSCH resource) can be terminated.

In this implementation, if the transmission start time of the uplink control information is later than the transmission start time of the uplink data, the transmission of the uplink data can be terminated from a resource in the first transmission resource that overlaps with the second transmission resource in the time domain; or, if the transmission start time of the uplink control information is earlier than the transmission start time of the uplink data, the uplink data may not be transmitted on the first transmission resource all the time. This embodiment does impose specific limitations on this.

Figure 1I:
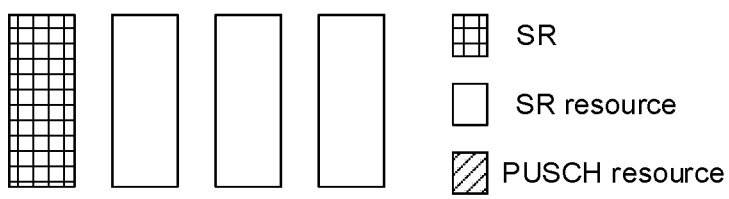
FIG. 1I is a schematic diagram of another transmission resource provided by the embodiment corresponding to FIG. 1A.
Figure 1I:
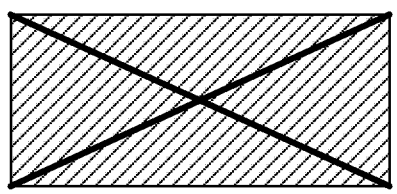
Figure 1J:
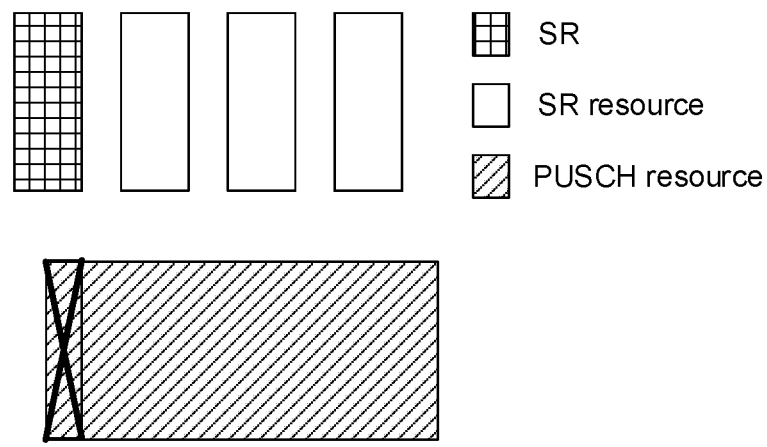
FIG. 1J is a schematic diagram of another transmission resource provided by the embodiment corresponding to FIG. 1A.

In an exemplary implementation, the transmission start time of the uplink control information is earlier than the transmission start time of the uplink data, as shown in FIG. 1I and FIG. 1J.

If the transmission start time of the uplink control information is later than the transmission start time of the uplink data, the technical solution in the prior art can be used to transmit uplink data only on the resource for transmitting the PUSCH (that is, the PUSCH resource). A Buffer Status Report (BSR) can also be transmitted on the PUSCH resource.

By adopting the technical solutions according to embodiments of the present disclosure, the instant transmission of the uplink control information can be effectively guaranteed, thereby reducing the time delay of the uplink service. Also, for the feedback information of the downlink data and the channel status information with low delay requirement, piggyback mapping to the PUSCH to carry such information can be avoided as much as possible.

In embodiments of the present disclosure, it is determined that the first transmission resource corresponding to the uplink data to be transmitted and the second transmission resource corresponding to the uplink control information to be transmitted overlap in the time domain, and the uplink control information is transmitted on the first transmission resource or the second transmission resource. In this way, instant transmission of uplink control information can be realized when the situation where the transmission resource for transmitting the uplink control information and the transmission resource for transmitting the uplink data conflict in the time domain occurs at a terminal.

It should be noted that for the foregoing method embodiments, for the sake of simple description, they are all expressed as a series of action combinations, but those skilled in the art should understand that the present disclosure is not limited by the described sequence of actions. Because according to the present disclosure, certain steps can be performed in other orders or can be performed simultaneously. Also, those skilled in the art should understand that the embodiments described herein are all exemplary embodiments, and the involved actions and modules are not necessarily required by all embodiments of the present disclosure.

In the above-mentioned embodiments, the description of each embodiment has its own focus. For parts that are not described in detail in an embodiment, reference may be made to related descriptions of other embodiments.

Figure 2:
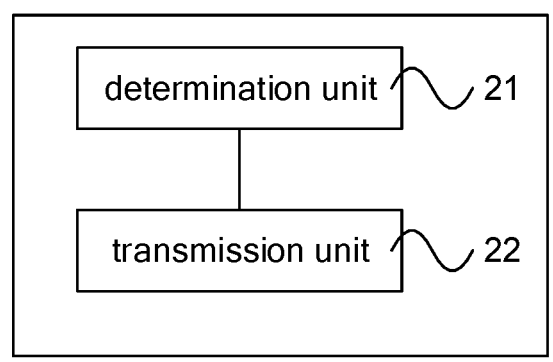
FIG. 2 is a schematic structural diagram of a device for transmitting uplink control information according to an embodiment of the present disclosure.

FIG. 2 is a schematic structural diagram of a device for transmitting uplink control information according to an embodiment of the present disclosure. As shown in FIG. 2, the device for transmitting uplink control information may include a determination unit 21 and a transmission unit 22. The determination unit 21 is configured to determine that a first transmission resource corresponding to uplink data to be transmitted and a second transmission resource corresponding to uplink control information to be transmitted overlap in a time domain. The transmission unit 22 is configured to transmit the uplink control information on the first transmission resource or the second transmission resource.

The first transmission resource or the second transmission resource may include but is not limited to at least one of a time domain resource, a frequency domain resource, or a power domain resource, which is not particularly limited in this embodiment.

It should be noted that the device for transmitting the uplink control information may be a terminal or a network, which is not particularly limited in this embodiment.

In embodiments of the present disclosure, the transmitted uplink data refers to uplink data that needs to be transmitted between the terminal and the network device and can be carried by a Physical Uplink Shared Channel (PUSCH).

In embodiments of the present disclosure, the transmitted Uplink Control Information (UCI) refers to the uplink control information that needs to be transmitted between the terminal and the network device, and can also be carried by the Physical Uplink Shared Channel (PUSCH). The uplink control information may include but not limited to at least one of the following information: feedback information of downlink data, that is, ACK information indicating that the downlink data is received correctly, or NACK information indicating that the downlink data is not received correctly; Channel Status Information (CSI); and Scheduling Request (SR) for uplink data.

In a possible implementation, the transmission unit 22 may be further configured to determine a type to which the uplink control information belongs. For example, the transmission unit 22 may be configured to, if the type to which the uplink control information belongs is the first type, transmit the uplink control information on the first transmission resource or the second transmission resource.

The first type may refer to a low-latency type, or may also refer to other types, which is not particularly limited in embodiments of the present disclosure.

In an exemplary implementation, the transmission unit 22 is configured to determine the type to which the uplink control information belongs according to a transmission parameter. The transmission parameter may include but is not limited to at least one of the following parameters: service type indication; transmission time interval length; feedback timing; resource indication type; transmission set; period; and configuration information.

In an exemplary implementation, the transmission unit 22 may be configured to transmit the uplink control information on a first part resource of the first transmission resource.

In this implementation, the first part resource may be used only for transmitting the uplink control information. That is, when there is uplink control information, the first part resource is used for transmitting the uplink control information; and when there is no uplink control information, the first part resource is not used for transmitting uplink data. Alternatively, the first part resource can be used not only for transmitting the uplink control information. That is, when there is uplink control information, the first part resource is used for transmitting the uplink control information; when there is no uplink control information, the first part resource is used for transmitting uplink data, which is not particularly limited in embodiments of the present disclosure.

In this implementation, the period of the first part resource and the period of the uplink control information may be the same or different, which is not particularly limited in embodiments of the present disclosure.

In this implementation, in each transmission opportunity, the number of the first part resources configured may be the same, or may also be different. For example, the number of the first part resources configured in a transmission opportunity close to a Demodulation Reference Signal (DMRS) is relatively small, which is not particularly limited in embodiments of the present disclosure.

In an exemplary implementation, the last symbol of the first part resource is not later than N symbols after the last symbol of the second transmission resource, where N is an integer greater than or equal to zero. As an example, the value of N can be zero.

In an exemplary implementation, the transmission unit 22 is configured to transmit the uplink control information on the first part resource of the first transmission resource using a specific sequence, a specific value, or an independently scrambled specific value.

In an exemplary implementation, the first part resource may include a part of discontinuous resources of at least one symbol in the first transmission resource in a frequency domain; a part of continuous resources of at least one symbol in the first transmission resource in the frequency domain; or all resources of at least one symbol in the first transmission resource in the frequency domain.

In an exemplary implementation, the transmission unit 22 is configured to transmit the uplink control information on the second transmission resource, and transmit the uplink data on the first transmission resource; or transmit the uplink control information on the second transmission resource, and suspend transmission of the uplink data on a second part resource of the first transmission resource; or transmit the uplink control information on the second transmission resource, and terminate transmission of the uplink data on the first transmission resource.

In an exemplary implementation, the second part resource may include but not limited to all resources in the first transmission resource that overlaps with the second transmission resource in the time domain, which is not particularly limited in embodiments of the present disclosure.

In an exemplary implementation, a transmission start time of the uplink control information is earlier than a transmission start time of the uplink data.

It should be noted that the methods in the embodiments corresponding to FIG. 1A to FIG. 1J can be implemented by the device for transmitting uplink control information. For detailed descriptions, please refer to the relevant content in the embodiments corresponding to FIG. 1A to FIG. 1J, which will not be repeated here.

By adopting the technical solutions according to embodiments of the present disclosure, the instant transmission of the uplink control information can be effectively guaranteed, thereby reducing the time delay of the uplink service. Also, for the feedback information of the downlink data and the channel status information with low delay requirement, piggyback mapping to the PUSCH to carry such information can be avoided as much as possible.

In embodiments of the present disclosure, the determination unit determines that the first transmission resource corresponding to the uplink data to be transmitted and the second transmission resource corresponding to the uplink control information to be transmitted overlap in the time domain, and the transmission unit transmits the uplink control information on the first transmission resource or the second transmission resource. In this way, instant transmission of uplink control information can be realized when the situation where the transmission resource for transmitting the uplink control information and the transmission resource for transmitting the uplink data conflict in the time domain occurs at a terminal.

Those skilled in the art can clearly understand that, for the convenience in description, the specific working procedures of the above-described systems, devices, and units can be found in descriptions regarding the corresponding processes in the foregoing method embodiments, and repeated descriptions are omitted here.

In the embodiments provided in the present disclosure, it should be understood that the disclosed systems, devices, and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separate parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit. The integrated units may be implemented in a form of hardware, or may be implemented in a form of hardware plus software functional units.

It should be noted that the above embodiments are only used to illustrate the technical solutions of the present disclosure, rather than limiting the scope of the present disclosure. Although the present disclosure has been described in detail with reference to the foregoing embodiments, those of ordinary skill in the art should understand that modifications may be made to technical solutions in the foregoing embodiments, or equivalent replacements of some of the technical features may be made; these modifications or replacements do not cause the essence of corresponding technical solutions to deviate from the spirit and scope of the technical solutions of the present disclosure.

What is claimed is:

1. A method for transmitting uplink control information, comprising:
   determining that a first transmission resource corresponding to uplink data to be transmitted and a second transmission resource corresponding to uplink control information to be transmitted overlap in a time domain; and
   transmitting the uplink control information on the second transmission resource, and terminating transmission of the uplink data on the first transmission resource;
   wherein before transmitting the uplink control information on the second transmission resource, the method further comprises:
   determining a type to which the uplink control information belongs according to configuration information, wherein the configuration information comprises priority; and
   if the type to which the uplink control information belongs is a low-latency type, transmitting the uplink control information on the second transmission resource.

2. The method according to claim 1, wherein the terminating transmission of the uplink data on the first transmission resource comprises:
   terminating the transmission of the uplink data from a resource in the first transmission resource that overlaps with the second transmission resource in the time domain.

3. The method according to claim 1, wherein the terminating transmission of the uplink data on the first transmission resource comprises:
   if the transmission start time of the uplink control information is later than the transmission start time of the uplink data, terminating the transmission of the uplink data terminated from a resource in the first transmission resource that overlaps with the second transmission resource in the time domain; and
   if the transmission start time of the uplink control information is earlier than the transmission start time of the uplink data, not transmitting the uplink data on the first transmission resource all the time.

4. The method according to claim 1, wherein the uplink control information comprises at least one of the following information:
   feedback information of downlink data;
   channel status information; and
   a scheduling request for uplink data.

5. The method according to claim 1, wherein the low-latency type is Ultra Reliable and Low Latency Communication (URLLC).

6. A device for transmitting uplink control information, comprising:
   a processor; and
   a memory for storing instructions executable by the processor;
   wherein when the instructions are executed by the processor, the device is caused to:
     determine that a first transmission resource corresponding to uplink data to be transmitted and a second transmission resource corresponding to uplink control information to be transmitted overlap in a time domain; and
     transmit the uplink control information on the second transmission resource, and terminate transmission of the uplink data on the first transmission resource;
   wherein when the instructions are executed by the processor, the device is caused to:
     before the uplink control information is transmitted on the second transmission resource, determining a type to which the uplink control information belongs according to configuration information, wherein the configuration information comprises priority; and if the type to which the uplink control information belongs is a low-latency type, transmit the uplink control information on the second transmission resource.

7. The device according to claim 6, wherein when the instructions are executed by the processor, the device is caused to:

terminate the transmission of the uplink data from a resource in the first transmission resource that overlaps with the second transmission resource in the time domain.

8. The device according to claim 6, wherein when the instructions are executed by the processor, the device is caused to:

if the transmission start time of the uplink control information is later than the transmission start time of the uplink data, terminate the transmission of the uplink data terminated from a resource in the first transmission resource that overlaps with the second transmission resource in the time domain; and if the transmission start time of the uplink control information is earlier than the transmission start time of the uplink data, not transmit the uplink data on the first transmission resource all the time.

9. The device according to claim 6, wherein the uplink control information comprises at least one of the following information:

feedback information of downlink data;
channel status information; and
a scheduling request for uplink data.

10. The device according to claim 6, wherein the low-latency type is Ultra Reliable and Low Latency Communication (URLLC).

11. A method for transmitting uplink control information, comprising:

determining that a first transmission resource corresponding to uplink data to be transmitted by a terminal and a second transmission resource corresponding to uplink control information to be transmitted by a terminal overlap in a time domain; and receiving the uplink control information from the terminal on the second transmission resource, while the uplink data on the first transmission resource is terminated by the terminal;

wherein before the uplink control information is received on the second transmission resource, the method further comprises:

determining a type to which the uplink control information belongs according to configuration information, wherein the configuration information comprises priority; and if the type to which the uplink control information belongs is a low-latency type, receiving the uplink control information on the second transmission resource.

12. The method according to claim 11, wherein the transmission of the uplink data is terminated from a resource in the first transmission resource that overlaps with the second transmission resource in the time domain.

13. The method according to claim 11, wherein:

if the transmission start time of the uplink control information is later than the transmission start time of the uplink data, the transmission of the uplink data is terminated from a resource in the first transmission resource that overlaps with the second transmission resource in the time domain; and if the transmission start time of the uplink control information is earlier than the transmission start time of the uplink data, the uplink data is not transmitted on the first transmission resource all the time.

14. The method according to claim 11, wherein the uplink control information comprises at least one of the following information:

feedback information of downlink data;
channel status information; and
a scheduling request for uplink data.

15. The method according to claim 11, wherein the low-latency type is Ultra Reliable and Low Latency Communication (URLLC).

16. A device for transmitting uplink control information, comprising:

a processor; and
a memory for storing instructions executable by the processor;

wherein when the instructions are executed by the processor, the device is caused to:

determine that a first transmission resource corresponding to uplink data to be transmitted by a terminal and a second transmission resource corresponding to uplink control information to be transmitted by a terminal overlap in a time domain; and receive the uplink control information from the terminal on the second transmission resource, while the uplink data on the first transmission resource is terminated by the terminal;

wherein when the instructions are executed by the processor, the device is further caused to:

before the uplink control information is received on the second transmission resource, determine a type to which the uplink control information belongs according to configuration information, wherein the configuration information comprises priority; and if the type to which the uplink control information belongs is a low-latency type, receive the uplink control information on the second transmission resource.

17. The device according to claim 16, wherein the transmission of the uplink data is terminated from a resource in the first transmission resource that overlaps with the second transmission resource in the time domain.

18. The device according to claim 16, wherein:

if the transmission start time of the uplink control information is later than the transmission start time of the uplink data, the transmission of the uplink data is terminated from a resource in the first transmission resource that overlaps with the second transmission resource in the time domain; and if the transmission start time of the uplink control information is earlier than the transmission start time of the uplink data, the uplink data is not transmitted on the first transmission resource all the time.

19. The device according to claim 16, wherein the uplink control information comprises at least one of the following information:

feedback information of downlink data;
channel status information; and
a scheduling request for uplink data.

20. The device according to claim 16, wherein the low-latency type is Ultra Reliable and Low Latency Communication (URLLC).

* * * * *